United States Patent
Theurer et al.

(10) Patent No.: US 10,203,989 B2
(45) Date of Patent: Feb. 12, 2019

(54) SYSTEMS AND METHODS RELATING TO HOST CONFIGURATION OPTIMIZATION IN A DATA CENTER ENVIRONMENT

(71) Applicant: Virtustream IP Holding Company LLC, Bethesda, MD (US)

(72) Inventors: Matthew Eric Theurer, Darnestown, MD (US); Sean Daniel Jennings, Potomac, MD (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 285 days.

(21) Appl. No.: 15/198,966

(22) Filed: Jun. 30, 2016

(65) Prior Publication Data
US 2017/0017513 A1    Jan. 19, 2017

Related U.S. Application Data

(60) Provisional application No. 62/192,503, filed on Jul. 14, 2015.

(51) Int. Cl.
*G06F 9/50*    (2006.01)
*G06F 9/455*   (2018.01)

(52) U.S. Cl.
CPC ........ *G06F 9/5077* (2013.01); *G06F 9/45558* (2013.01); *G06F 9/50* (2013.01); *G06F 9/505* (2013.01); *G06F 9/5083* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

PUBLICATIONS

Cooke, "How do I size the physical server to host virtual machines?", Mar. 9, 2015. (Year: 2015).*
Pai, "Server sizing considerations for virtual environments", Mar. 15, 2011. (Year: 2011).*
Siebert, "Sizing server hardware for virtual machine", Jun. 26, 2008. (Year: 2008).*

* cited by examiner

*Primary Examiner* — Qing Yuan Wu
(74) *Attorney, Agent, or Firm* — Ryan, Mason & Lewis, LLP

(57) ABSTRACT

Systems and methods are disclosed for calculating and utilizing a variable CPU weighting factor for host configuration optimization in a data center environment. According to one illustrative embodiment, implementations may utilize actual workload profiles to generate variable CPU weighting factor(s) to optimize host configurations.

20 Claims, 3 Drawing Sheets

SYSTEMS AND METHODS RELATING TO HOST CONFIGURATION OPTIMIZATION IN A DATA CENTER ENVIRONMENT

CROSS REFERENCE TO RELATED APPLICATION

This application is based upon and claims the benefit of priority from U.S. Provisional Patent Application No. 62/192,503, filed Jul. 14, 2015, the entirety of which is incorporated by reference herein.

FIELD

The present disclosure is directed to host configuration optimization in data center environments, and, more particularly, towards systems and methods that involve processing of variable CPU weighting factor(s) to optimize host configurations.

BACKGROUND

Distribution of customer content and applications, such as in the cloud, may be performed based on various predefined quanta of computing resources that may be allocated among the variety of machines available to store and/or host such information. With regard to aspects of the innovations herein, one such quanta may be defined as including four components: a measure of CPU Cycles consumed, a measure of storage activity, a quantity of intra-cloud network bandwidth, and a quantity of RAM consumed. With advances in technology, the amount of work, aka instructions completed, per CPU clock cycle, increases over time as processors gain new capabilities. Some examples of these capabilities include VT, AES-NI, MMX extensions, etc. Moore's law predicts a doubling of transistors on a die every 18 months yielding an approximate doubling of compute power. As such, one of the drawbacks addressed herein is how to accommodate increasing compute power in hosts with static predefined quanta of computing resources.

BRIEF DESCRIPTION OF THE FIGURES

The accompanying drawings, which constitute a part of this specification, illustrate various implementations and aspects of the innovations herein and, together with the description, help illustrate the principles of the present inventions. In the drawings.

DETAILED DESCRIPTION OF ILLUSTRATIVE IMPLEMENTATIONS

The following description includes some examples consistent with certain aspects related to the present innovations. Wherever possible, the same reference numbers will be used throughout the drawings to refer to the same or like parts.

According to innovations herein, a quantum of computing resources may be defined as consisting of four components: a measure of CPU Cycles consumed, a measure of storage activity, a quantity of intra-cloud network bandwidth, and a quantity of RAM consumed. In various representative implementations discussed in more detail below, for purpose of illustration, not limitation, these four components may be defined in a μVM or micro virtual machine as: 200 MHz of CPU Cycles consumed, 40 IOPS of storage activity, 2 Mbps of intra-cloud network bandwidth, and 768 MB of RAM consumed. While RAM and bandwidth are static in the amount of "work" done per μVM allocation, IOPS and CPU cycles are not. The amount of data transferred per IOP varies based on block size with a typical block size of 4 KB.

As set forth in more detail below, certain systems and methods herein relate to host configuration optimization in a data center environment. Further, various aspects may also relate to implementing a variable weighting factor $W_f$ for optimizing host configuration, wherein such variable weighting factors may be based on actual workload usage profiles. Utilizing various innovations herein enables the provision of recommended host memory configurations based on actual Memory-to-CPU utilization ratios. In addition, according to certain embodiments herein, by means of classifying such ratios per workload class and/or per processor class, workload placement may be even further optimized via dynamically evaluating the workloads of similar class(es) and placing those workloads on the compute cluster best suited in terms of CPU and memory configuration to support those workloads. For example, illustrative implementations herein may include: determining classifications of Memory-to-CPU utilization ratios per workload class and/or per processor class, dynamically evaluating the workloads of one or more similar classes and placing said workloads on one or more compute clusters best suited in terms of CPU and memory configuration to support said workloads, optimizing workload placement and/or host configuration as a function of the dynamic evaluation.

Figure 1:
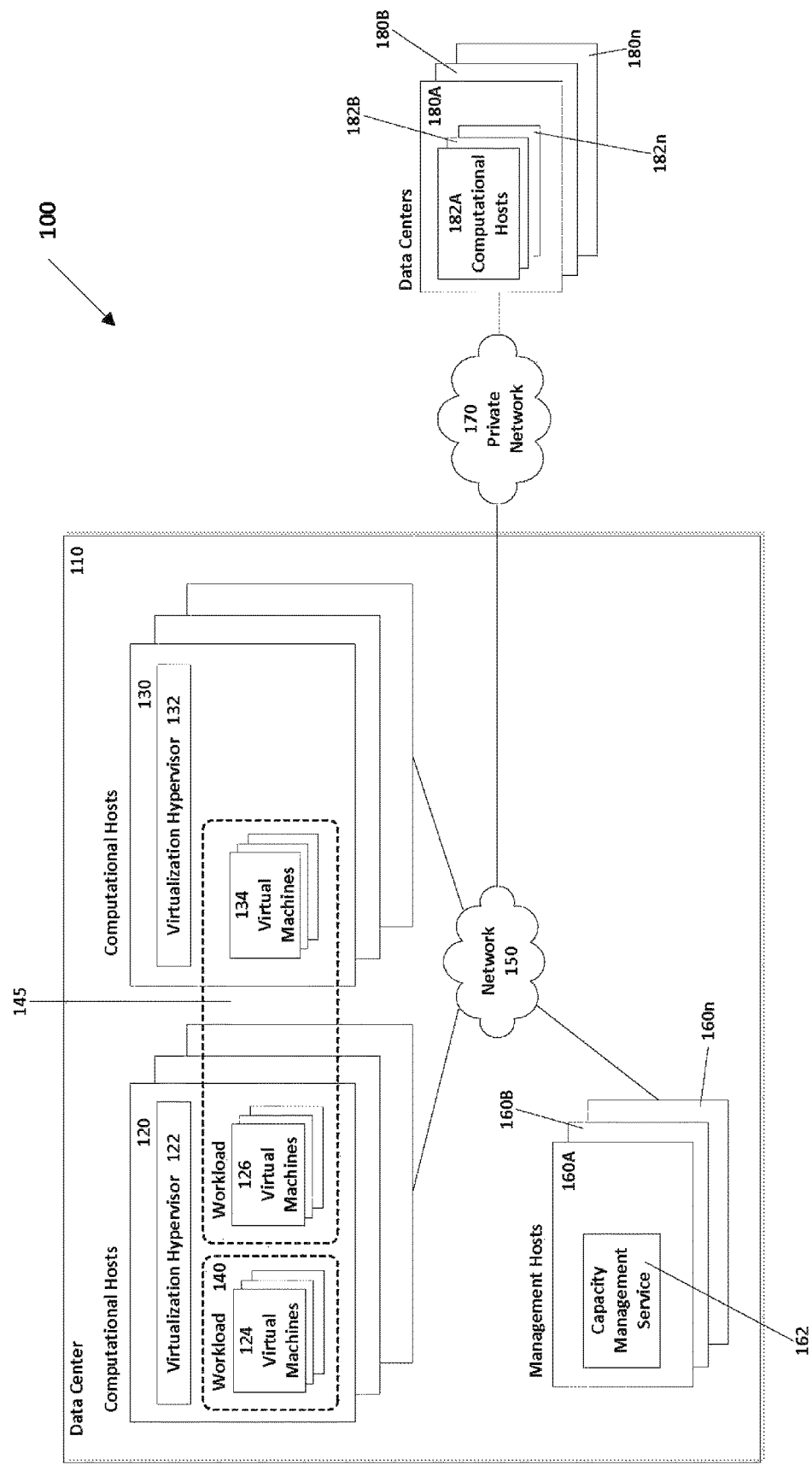
FIG. 1 is a block diagram of an illustrative data center environment and associated virtualized computing infrastructure, according to one or more aspects consistent with the innovations herein.

FIG. 1 is a block diagram of an illustrative data center environment 100 and associated virtualized computing infrastructure, according to one or more aspects consistent with the innovations herein. As detailed below, an example data center environment 100 may include various data center components and architecture as well as associated virtualized computing infrastructure. Referring to FIG. 1, physical computing machines comprising or associated with such virtualized computing infrastructure may be operated and maintained in a common facility referred to herein as the data center 110. The example data center environment 100 shown may include one or more main data centers 110 as well as, optionally, additional data center 180A, 180B, 180n, etc. Such additional data centers 180 may be coupled with the main data center 110 via a separate or dedicated network 170, such as a secure or private network. Each data center 110, in turn, may include a plurality of computational hosts 120, 130, one or more management hosts 160A, 160B, 160n, and a network 150. According to various features herein, management hosts 160 may include a capacity management service component 162 and are coupled with the computational hosts 120, 130 via the network 150. Further, each computational host may include a hypervisor and a collection of virtual machines and/or other software processes. For purpose of illustration, as shown in FIG. 1, a first computational host 120 may include a virtualization hypervisor 122, a first set of virtual machines 124 and/or other software processes, and a second set of virtual machines 126 and/or other software processes. Similarly, a second computational host 130 may include a virtualization hypervisor 132 and its own set(s) of virtual machines 134 and/or other software processes. Finally, as set forth in more detail below, various workloads resident or established within the data center 110 may be defined via collections of virtual machines and/or other software processes. For example, a first workload 140 shown in FIG. 1 may be defined in relation to virtual machines 124 associated with only the first computational host 120, while other workloads 145 may be defined in relation to a plurality of virtual machines 126, 134 spanning across a plurality of computational hosts, such as the first computational host 120 and the second computational host 130 of FIG. 1.

Consistent with FIG. 1, a data center may contain any number of physical computing machines, which may in turn host any number of virtualized infrastructure resource consumers, such as virtual machines 124, 126, 134 or individual software processes. In this embodiment, two classifications of physical computing machines are characterized as hosts for virtual machines or software processes: computational hosts 120, 130, 182 and management hosts 160. Computational hosts 120, 130, 182 are those physical computing machines providing virtualized infrastructure resources to third-party consumers. Management hosts 160 are those physical computing machines providing virtualized infrastructure resources to virtual machines or software processes used to manage the operations of the data center, itself. A software process implementation of the host configuration optimization methodology according to the innovations herein, may be hosted on a management host 160 or series of management hosts 160A, 160B, 160n connected via a computer network 150. The management hosts may be further connected to any number of computational hosts via a computer network 150. Each computational host 120, 130, 182 may provide capacity to be consumed by virtual machines or other software processes. An aggregation of consumers of virtual infrastructure resources, often virtual machines, originating from a single source is referred to herein as workload 140, 145. The virtual machines or software processes constituting a specified workload 145 may span multiple computational hosts. In some embodiments, multiple data centers 110, 180 may be connected via another network 170, such as a secure or private computer network, allowing a workload to span multiple data centers across such additional networks, as well.

Figure 2:
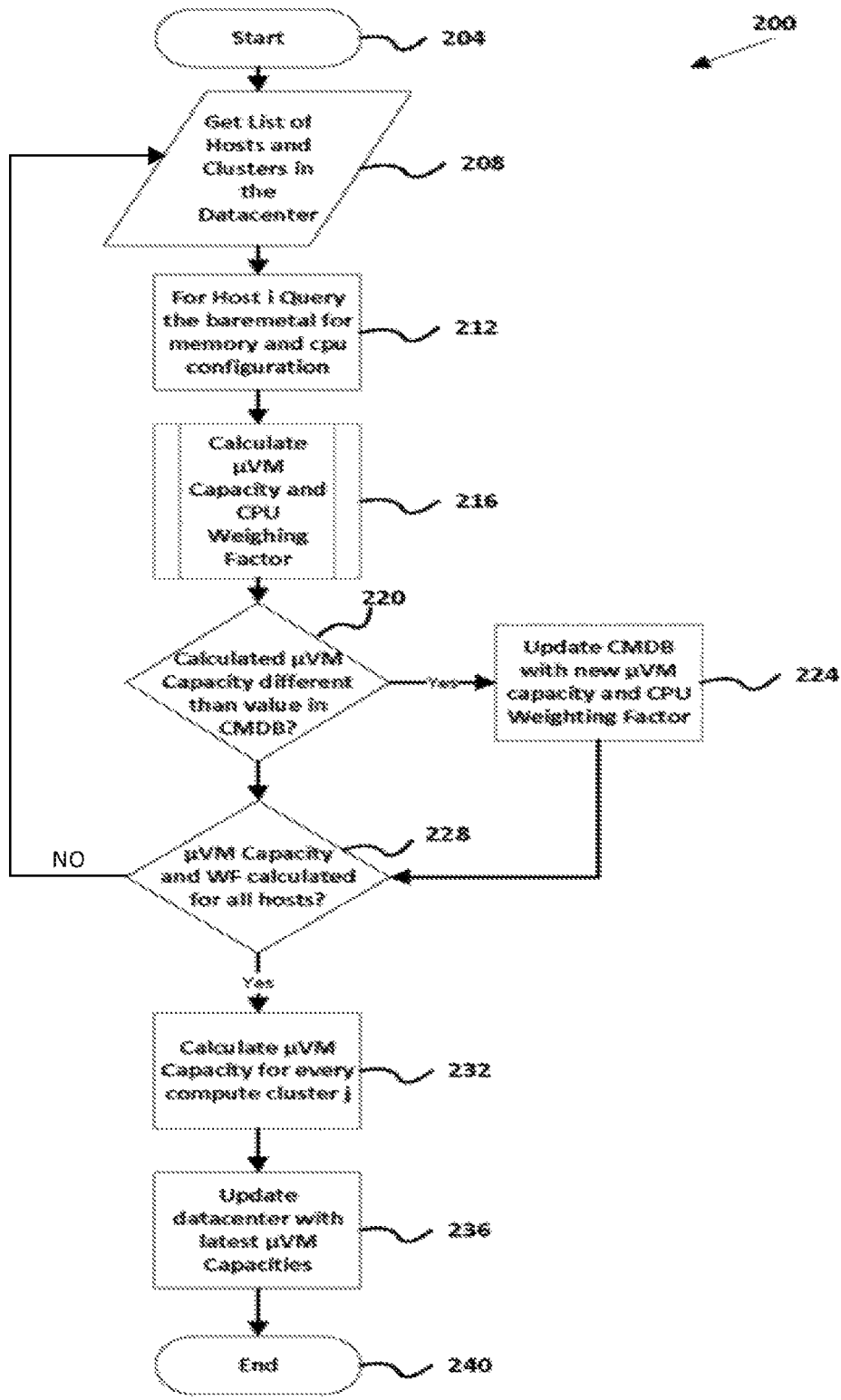
FIG. 2 is a flow chart depicting an illustrative host configuration management process, according to one or more aspects consistent with the innovations herein.

FIG. 2 is a flow chart depicting an illustrative host configuration management process, according to one or more aspects consistent with the innovations herein. Referring to FIG. 2, one example overall host configuration optimization process flow is illustrated. Such process and associated computer processing may be executed inside the management layer of a data center 110 and may gather data from and provide optimization recommendations on hosts 120, 130 running in the compute layer.

Upon start-up 204, either scheduled or by notification of change, the illustrative process may query and generate, at 208, a list of all hosts and clusters within a data center. Next, the illustrative process may query each host, at 212, for its processor and memory configuration. The process may then, at 216, calculate the μVM capacity and/or the CPU weighting factor, $W_f$, as set forth in more detail below. Although the example embodiments described herein relate to the use of the μVM as the quantum of computing resources, those skilled in the art will appreciate that any quantum of computing resources may be used. Upon determining such information, the process may calculate the new μVM capacity of the host and the recommended memory configuration, at 220. Here, these values may also be compared against the previous values stored in a configuration management database (CMDB). If they are new, the configuration management database may be updated, at 224. Once these values are calculated for every host 228, the new μVM capacity of every compute cluster "j" may be calculated, at 232. Finally, at 236, the data centers may then be updated with the determined μVM information. To configure the data centers, here, for example, the xStream license key manager may be updated with the latest μVM capacities. The recommended optimal memory configurations may then be presented via the xStream UI to the operator(s).

Regarding the overall process, here, a method for optimizing host configurations in a data center is disclosed. With respect to the example method shown in FIG. 2, such process may include: obtaining a list of hosts and clusters in the data center 208; and, for each host, querying the device (e.g., baremetal) for memory and central processor unit (CPU) configuration information 212, calculating a capacity of micro virtual machines and/or a CPU variable weighting factor, $W_f$ 216, determining whether the calculated μVM capacity is different than an existing μVM capacity value in a configuration management database 220, and updating the configuration management database with the new μVM capacity and the CPU variable weighting factor, $W_f$, if different from existing values 224. Further, once μVM capacity and the variable weighting factor have been calculated for all hosts, calculating the μVM capacity for every computer cluster may be performed 232, followed by processing information to update the data center with latest μVM capacities 236.

Illustrative Host Micro Virtual Machine (μVM) Processing

In some instances, an initial or 'raw' quantity or amount of μVM capacity per host may be calculated using the following formula:

Current Raw μVM capacity formula      Equation 1

$$\frac{S*C*M}{200} = \mu VM_c$$

Where: S is the Number of CPU Sockets;
    C is the Number of Cores per CPU;
    M is the Clock Rate of the CPU in MHz;
    200 is a constant in MHz defined as the number of Clock Cycles per μVM; and
    $\mu VM_c$ is the initial or raw number of μVM capacity per host Given this initial or raw quantity of μVM capacity per host, the amount of memory required in a host to service that amount of μVM capacity may then be calculated using the following formula:

$$768*\mu VM_c = M_r \quad \text{Equation 2—One Memory Formula Based on } \mu VM \text{ Capacity}$$

Where: $\mu VM_c$ is the raw number of μVM capacity per host;
    768 is a constant in MB defined as the amount of Memory Consumed per μVM; and
    $M_r$ is the amount of RAM, in MB, per host.

Constants, e.g., 200 in Equation 1 and 768 in Equation 2, as used here and below, may vary based on system parameters such those defining the quantum of computing resources. The constant increase in CPU capabilities per cycle along with decreasing clock rates per core, as more cores are added, may yield an increasing imbalance between the actual capabilities of processors and the μVM definition.

As to a first illustrative calculation, take, for example, an IBM System x3650 M3 with Intel x5680 Processors running at 3.33 Ghz manufactured in 2009. Given this device, Equation 1 yields:

$$\frac{2*6*3300}{200} = 198 \; \mu VM_c$$

Regarding the processor of this example μVM capacity calculation for an IBM x3650 M3, such calculation yields 198 μVM$_c$, or 16.5 μVMs per core.

Next, calculating for the optimal memory yields a recommended memory configuration of: 768*198=152,064 MB. This may be the value used for the optimal memory configuration for such an IBM x3650 M3 device.

As to a second illustrative calculation, take, for example, a Cisco UCS C260 with Intel E7-2860 Processors running at 2.27 GHz manufactured in 2014. Given this device, Equation 1 yields:

$$\frac{2*10*2270}{200} = 227 \; \mu VM_c$$

Regarding the processor of this example μVM capacity calculation for a Cisco UCS C260, such calculation yields 227 μVM$_c$, or 11.7 μVMs per core, a 29% reduction in μVMs per core. It also yields an optimal recommended memory configuration of:

768*227=174,336 MB.

As stated above, Moore's Law predicts a doubling of transistors on die every 18 months, yielding an approximate doubling of compute power. Following Moore's law would indicate that a CPU manufactured in 2014 should have approximately four times (4×) the capabilities of a CPU manufactured in 2009. This would indicate that the optimal amount of memory in a host may increase, in a linear or close to linear relationship to the compute power.

Furthermore, empirical data gathered over the past 5 years running thousands of workloads has shown an increasing memory-to-CPU ratio. The latest analyses show a memory-to-CPU utilization ratio(s) closer to 13.2 while the μVM may define a ratio more on the order of 3.84. This is a 3.44 times increase in capabilities, which is in line with Moore's law.

A CPU weighting factor may also be utilized in various embodiments to account for increasing compute power per clock cycle. Implementations herein may account for this via changing the formula to calculate the initial or raw amount of μVM capacity per host according to the following equation:

$$\frac{S*C*M*W_f}{200} = \mu VM_c$$

Equation 3—Revised RAW μVM Capacity Formula with Weighting Factor

Where: S is the Number of CPU Sockets;
C is the Number of Cores per CPU;
M is the Clock Rate of the CPU in MHz;
$W_f$ is a CPU variable weighting factor to accommodate overall increased capabilities per clock cycle;
200 is a constant in MHz defined as the number of Clock Cycles per μVM; and
μVM$_c$ is the raw number of μVMs capacity per host.

One approach to determine $W_f$ in such implementations is to use SPECint and SPECfp ratings. By choosing a baseline system and then using SPEC rating ratios, a weighting factor accommodating CPU power per clock cycle variability may be achieved. Variations of such an approach may suffer from a few drawbacks. First, SPEC ratings are based on theoretical integer and floating point operations that may not be indicative of real life workloads. Also, SPEC ratings may vary based on manufacturer configurations and may vary even amongst systems with the exact same processor class and clock rate. In addition, a weighting factor based on SPEC ratings may require a static mapping table and manual maintenance of that table. Finally, a weighting factor based on SPEC ratings may be static in nature and may not reflect the dynamic nature of real life workloads.

Variable Weighting Factor Aspects

According to implementations herein, the variable weighting factor $W_f$ may be calculated using the following formula:

Variable *CPU* Weighting Factor Formula     Equation 4

$$W_f = \frac{\frac{1}{m} * \sum_{i=1}^{m} \left( \frac{\frac{1}{n} * \sum_{j=1}^{n} M_{ij}}{\frac{1}{n} * \sum_{j=1}^{n} C_{ij}} \right)}{X}$$

$$(M_{ij}, C_{ij}) \in (\alpha, \beta)$$

Where n is the total number of samples for the i$^{th}$ Virtual Machine across any arbitrary sample window, m is the total number of Virtual Machine s across the same arbitrary sample window, $M_{ij}$ is the memory consumed by the i$^{th}$ Virtual Machine at time index j within set α,β, $C_{ij}$ is the CPU consumed by the i$^{th}$ Virtual Machine at time index j within set α,β, X is a constant based on the definition of the quantum of computing resources (e.g., in the representative definition of μVM, it may be 3.84, based on the relevant parameters, i.e., 768 MB/200 MHz), α is any arbitrary class of virtual machines, and β is any arbitrary class of processor.

Some examples of virtual machine classes may include, but are not limited to: all VMs of a given configuration, for example, 2 vCPUs and 4 GB of RAM; all VMs running a specific operating system, for example, Windows 2008, RedHat Linux; all VMs running a particular class of software, for example RDBMs software; and all VMs running a specific piece of software, some examples being MS SQL Server, SAP ECC 6, and Apache Web Services. Further, some examples of processor classes may include, but are not limited to: all Intel Nehalem processors, all Intel Haswell processors, all Intel Processors, all AMD Processors, all Power Processors, all E7v2 processors, all E7v2-2860 processors, and all Power7 processors.

Illustrative Variable Weighting Factor, $W_f$, Innovations

Figure 3:
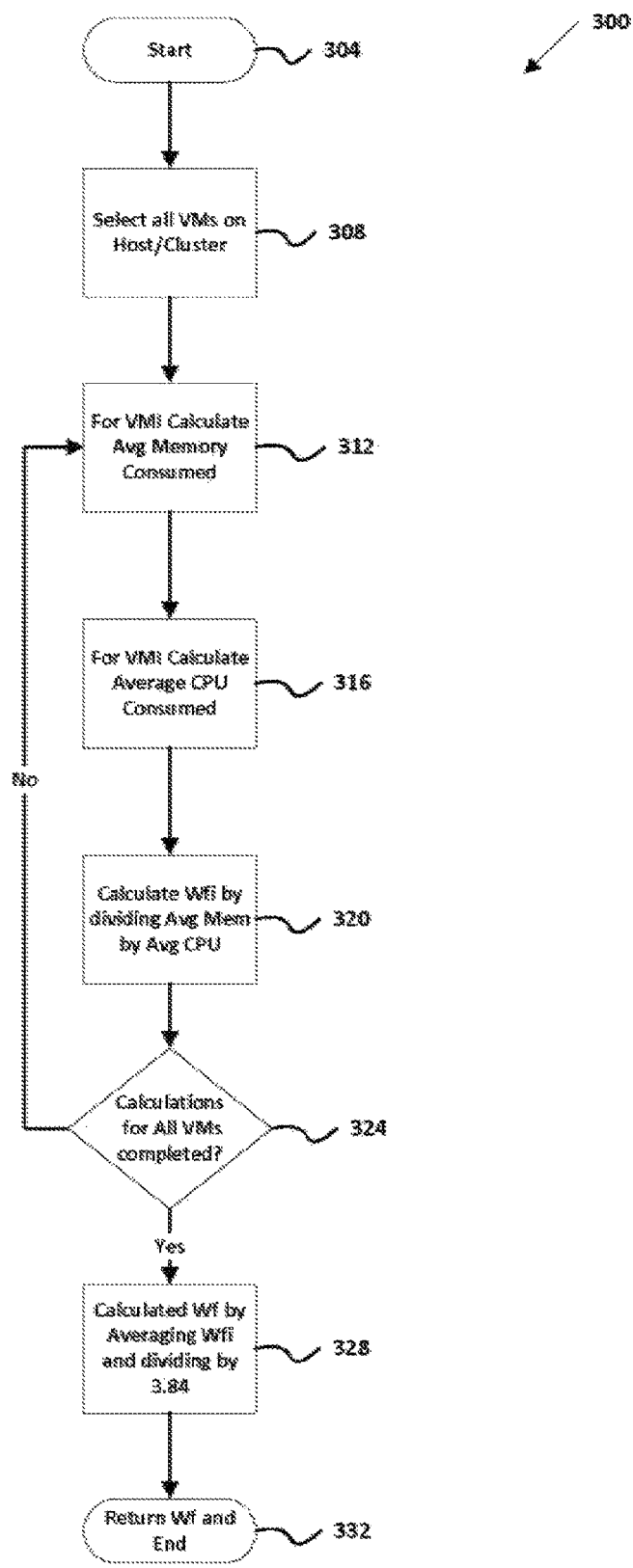
FIG. 3 is a flow chart of an illustrative implementation of an example variable weighting factor calculation process, according to one or more aspects consistent with the innovations herein.

FIG. 3 is a flow chart of an illustrative implementation of an example variable weighting factor calculation process according to one or more aspects consistent with the innovations herein. FIG. 3 depicts an example method for determining a variable weighting factor, $W_f$, in connection with determining optimal host configuration of a data center. According to various implementations herein, consistent with FIG. 3 and otherwise, an illustrative variable weighting factor algorithm is explained in connection with a set of virtual machines of a first class, e.g. class α, running on a processor of a first class, e.g. class β, with data collected for some arbitrary sample window. The larger the sample window, the more data points, the more statistically valid the calculations.

Referring to FIG. 3, an illustrative process for determining a variable weighting factor is shown. Upon start 304 of such illustrative process, a selection of a sample set of all virtual machines to be analyzed for optimization may be made, at 308. This sample set may be selected for various groups of host(s) and/or cluster(s) of interest, and may comprise analysis over a specified sample window. Next, an iterative process of three steps 312, 316, 320 may be performed for each virtual machine, "i", of the set of virtual machines selected. As a first part of this iterative process, at 312, measurement(s) and/or calculation(s) may be performed for the subject virtual machine to determine the average memory consumed by that virtual machine in the sample cycle. Next, at 316, measurement(s) and/or calculation(s) may be performed to determine the average amount of CPU cycles used by that virtual machine in the sample window. Then, at 320, an individual variable weighting component, $W_{fi}$, may be calculated per virtual machine, by dividing the average memory consumed ("step 1") by the average amount of CPU cycles used ("step 2"), for each virtual machine.

At the end of each iteration of this loop process, at 324, a determination may be made as to whether or not the necessary calculations have been performed for all selected virtual machines. If not, the process may return to step 312 to begin another iteration to determine the desired information regarding the next virtual machine. However, once the average amount of memory used (step 1) and the average amount of CPU cycles used (step 2) across all of the samples in the sample window for each of the $i^{th}$ VMs have been calculated, and the results divided for all virtual machines in the sample set ("step 3"), the process may continue.

Next, once the individual variable weighting components have been calculated for all of the selected set of virtual machines, the overall variable weighting factor, $W_f$, may be determined, at 328. In one example, the variable weighting factor may be calculated by averaging the individual variable weighting components and dividing by the specified variable, X, given by the definition of the micro virtual machine (e.g., 3.84, for the representative implementation with 768 MB/200 MHz in a μVM).

Usage of such variable weighting factor information for host configuration optimization is next described. For example, the variable weighting factor may be applied to the initial or raw micro virtual machine ($μVM_c$) formula, per Equation 3, to calculate a quantity of CPU micro virtual machines (μVMs) available. Finally, using the adjusted value of μVMs calculated, here, optimal memory configuration may be determined using the processing described in connection with FIG. 2.

As an illustrative application of this process helps illustrate the innovations herein, details of the following example scenario are provided. Consider a cloud service provider that has two compute clusters. Compute cluster 1 has processor class γ and compute cluster 2 has processor class λ. On each of these compute clusters there are two primary types of workloads. Workload class φ and workload class θ. Aspects of the innovations herein may involve features of one or both of two tasks associated with host configuration optimization: (1) a first task of determining the optimal memory configuration for all hosts in their respective computer clusters based on existing workload on each computer cluster; and/or (2) a second task of determining a variable weighting factor, $W_f$, for both classes of workload and assigning workloads to optimal computer clusters based on current configurations.

Task #1

The first task may entail determining the optimal memory configuration for all hosts in their respective compute clusters based on the current workloads in existence on each compute cluster. Here, to begin, querying of existing hosts in each compute cluster may be performed to determine a respective workload for each computer cluster. Next, all virtual machines in compute cluster 1 may be assigned to set a regardless of operating system or installed application(s). In one illustrative implementation, for example, all VMs may be selected/assigned in an effort to determine the optimal memory configuration for all hosts based on the current workload. Then, the variable weighting factor, $W_f$, may be calculated according to the formula of Equation 4, and/or the process of FIG. 3. Finally, optimal memory configuration information may be obtained as set forth in connection with FIG. 2 and the associated written description.

Once the optimal memory configuration information is determined, the cloud service provider may then use this information in several ways. According to some implementations, the cloud service provider may change memory configurations of existing hosts to optimize the CPU utilization. Here, for example, changing memory configurations may be accomplished by adding memory or removing memory modules from physical hosts in order to achieve optimal densities. Implementations for changing memory configurations, as described herein, may be utilized alone or in connection with other host or data center operations. For example, the cloud service provider may make a deployment placement decision to place these workloads on one or more computer clusters with the most optimal configuration. These placement decisions can be performed automatically and may utilize or leverage existing technologies, such as xOPT by Virtustream.

Moreover, this optimal memory configuration information may be provided to the cloud operators as both a recommended value and as an efficiency value in terms of actual versus recommend configuration. In some implementations, the efficiency value may be automatically calculated as the ratio of actual memory configuration divided by recommended memory configuration and may be as close to 1 as possible. For example, a recommended memory value of 512 MB with an actual memory configuration of 768 MB would yield an efficiency value of 0.67.

Additionally, such optimal memory configuration information may be utilized to guide capacity planning and sizing of new hosts, for net capacity expansion, and/or for server refreshes.

Furthermore, given financial data, host capital costs, operational costs (power, cooling, floor space, etc.), additional financial analysis may be performed and/or calculated, providing the optimal configuration from a financial perspective. Example of such financial analysis may involve data regarding cooling costs, power costs, hardware costs, labor costs, and the like.

Task #2

The second task of host configuration optimization may entail determining the $W_f$ for the two classes of workload (φ and θ) and assigning workloads to optimal compute cluster based on current configurations. As also understood in connection with FIG. 3, this task may include, as a first step, assigning all virtual machines in compute cluster 1 with processor class γ and workload class φ into first data set (α, β) and calculating the variable weighting factor, $W_f$, according to the processing and/or formulae set forth herein. This task may next include repeating step 1 for all virtual machines in compute cluster 1 with processor class γ and workload class θ. Then, step 1 may be repeated for all virtual machines in compute cluster 2 with processor class λ and workload class φ. As a final part of this sub-process, this task may include repeating step 1 for all virtual machines in compute cluster 2 with processor class λ and workload class θ.

According to some implementations, additional processing may also be performed in connection with additional compute clusters. For example, implementations may include assigning all virtual machines in at least one additional compute cluster of the first processor class, γ, and the first workload class, φ, into a fifth data set (α, β) and calculating another variable weighting factor, $W_f$, relating to the first workload class, φ, and assigning all virtual machines in the at least one additional compute cluster of the first processor class, γ, and the second workload class, θ, into a sixth data set (α, β) and calculating a fifth variable weighting factor, $W_f'$, relating to the second workload class, θ. Moreover, further such processing may be performed to yield still additional data sets.

Next, by applying the variable weighting factor, $W_f$, for each (α, β) data set, determination may be made as to the best "fit" of the existing workloads to the compute clusters as they are currently configured to optimize utilization of both memory and CPU. In some implementations, the best fit may be calculated automatically by comparing the calculated $W_f$ to the actual memory-to-CPU ratio of the existing clusters. Here, by way of one representative example, if the calculated $W_f$ is 3.4 and we have two clusters with differing configurations, one with a memory-to-CPU ratio of 4.5 and another with a ratio of 3.5, the best fit is the second cluster with the ratio of 3.5 below.

As used in this specification, the singular forms "a," "an" and "the" include plural referents unless the context clearly dictates otherwise. Thus, for example, the term "a downstream agent" is intended to mean a single downstream agent, or a combination of downstream agents.

Some embodiments described herein relate to a computer storage product with a computer-readable medium (also may be referred to as a processor-readable medium) having instructions or computer code thereon for performing various computer-implemented operations. The media and computer code (also may be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein may include various combinations and/or sub-combinations of the functions, components, and/or features of the different embodiments described.

The invention claimed is:

1. A method for optimizing host configurations in a data center, the method comprising:
    obtaining a list of hosts and clusters in the data center;
    for each of the hosts on the list:
        querying for memory and central processor unit (CPU) configuration information;
        calculating a host virtual machine capacity (VM capacity) and a CPU variable weighting factor; and
        storing the calculated host VM capacity and the calculated CPU variable weighting factor in a configuration management database (CMDB);
    once the host VM capacity and the CPU variable weighting factor have been calculated for all of the hosts on the list, calculating a cluster VM capacity for each of the clusters on the list;
    processing information to update the data center with the calculated cluster VM capacity for each of the clusters on the list; and
    placing a given workload on a given one of the clusters on the list based at least in part on the calculated cluster capacity for the given cluster.

2. The method of claim 1 wherein the CPU variable weighting factor, $W_f$, is calculated using the following formula:

$$W_f = \frac{\frac{1}{m} * \sum_{i=1}^{m} \left( \frac{\frac{1}{n} * \sum_{j=1}^{n} M_{ij}}{\frac{1}{n} * \sum_{j=1}^{n} C_{ij}} \right)}{X}$$

$(M_{ij}, C_{ij}) \in (\alpha, \beta)$ wherein:
    n is the total number of samples for an $i^{th}$ Virtual Machine across an arbitrary sampling window;
    m is the total number of Virtual Machines across the arbitrary sampling window;
    $M_{ij}$ is the memory consumed by the $i^{th}$ Virtual Machine at time index j within set α,β;
    $C_{ij}$ is the CPU consumed by the $i^{th}$ Virtual Machine at time index j within set α,β;
    X is a constant based on a definition of a quantum of computing resources;
    α is any arbitrary class of virtual machines; and
    β is any arbitrary class of processor.

3. The method of claim 1, further comprising:
   determining an optimal memory configuration for each of the hosts on the list according to the calculated host VM capacity; and
   changing a memory configuration of at least one of the hosts on the list based on the optimal memory configuration.

4. The method of claim 3, wherein changing the memory configuration comprises at least one of adding memory modules and removing memory modules from one of the hosts on the list in order to achieve an optimal density.

5. The method of claim 1, further comprising:
   determining an optimal memory configuration for each of the hosts on the list according to the calculated host VM capacity; and
   providing the optimal memory configuration to a user as one or more optimal configuration values, including a recommended value corresponding to at least one of a recommended memory configuration and an efficiency value, the efficiency value being automatically calculated as a ratio of an actual memory configuration divided by the recommended memory configuration.

6. The method of claim 1, wherein the host VM capacity for each of the hosts on the list is calculated as a function of:

$$\frac{S * C * M * W_f}{Y} = VM_c$$

wherein S is quantity of CPU sockets, C is quantity of cores per CPU, M is clock rate of the CPU in megahertz (MHz), $W_f$ is the CPU variable weighting factor, Y is a constant in MHz defined as a quantity of clock cycles per VM, and $VM_c$ is the VM capacity for that host.

7. The method of claim 6, wherein the CPU variable weighting factor, $W_f$, is calculated using the following formula:

$$W_f = \frac{\frac{1}{m} * \sum_{i=1}^{m} \left( \frac{\frac{1}{n} * \sum_{j=1}^{n} M_{ij}}{\frac{1}{n} * \sum_{j=1}^{n} C_{ij}} \right)}{X}$$

$$(M_{ij}, C_{ij}) \in (\alpha, \beta)$$

wherein:
   n is the total number of samples for the an $i^{th}$ Virtual Machine across an arbitrary sampling window;
   m is the total number of Virtual Machines across the arbitrary sampling window;
   $M_{ij}$ is the memory consumed by the $i^{th}$ Virtual Machine at time index j within set $\alpha,\beta$;
   $C_{ij}$ is the CPU consumed by the $i^{th}$ Virtual Machine at time index j within set $\alpha,\beta$;
   X is a constant based on a definition of a quantum of computing resources;
   $\alpha$ is any arbitrary class of virtual machines; and
   $\beta$ is any arbitrary class of processor.

8. The method of claim 6, further comprising:
   calculating an amount of memory required in a host to service the $VM_c$ as a function of:

$Z*VM_c=M_r$ wherein $VM_c$ is the calculated host VM capacity for that host, Z is a constant in megabytes (MB) defined as amount of memory in a quantum of computing resources, and $M_r$ is an optimal amount of random-access memory (RAM), in MB, for that host.

9. The method of claim 1, wherein calculating the CPU variable weighting factor comprises:
   selecting a sample set of virtual machines on at least one of the hosts and the clusters on the list to analyze over a sample window for optimization;
   for each virtual machine of the sample set of virtual machines:
     calculating average memory used by the virtual machine in the sample window;
     calculating average amount of CPU cycles used by the virtual machine in the sample window; and
     calculating individual variable weighting components for the virtual machine by dividing the average memory used by the average amount of CPU cycles used; and
   calculating the CPU variable weighting factor by averaging the individual variable weighting components for all of the virtual machines in the sample set of virtual machines.

10. The method of claim 1, wherein storing the calculated host VM capacity and the calculated CPU variable weighting factor in the CMDB comprises, for a given one of the hosts in the list:
    updating a previously-stored host VM capacity value for the given host in the CMDB with the calculated host VM capacity for the given host responsive to determining that the calculated host VM capacity for the given host is different than the previously-stored host VM capacity value for the given host; and
    updating a previously-stored CPU variable weighting factor value for the given host in the CMDB responsive to determining that the calculated CPU variable weighting factor for the given host is different than the previously-stored CPU variable weighting factor value for the given host.

11. An apparatus comprising:
    at least one processing device comprising a processor coupled to a memory;
    the at least one processing device being configured:
      to obtain a list of hosts and clusters in the data center;
      for each of the hosts on the list:
        to query for memory and central processor unit (CPU) configuration information;
        to calculate a host virtual machine capacity (VM capacity) and a CPU variable weighting factor; and
        to store the calculated host VM capacity and the calculated CPU variable weighting factor in a configuration management database (CMDB);
      once the host VM capacity and the CPU variable weighting factor have been calculated for all of the hosts on the list, to calculate a cluster VM capacity for each of the clusters on the list;
      to process information to update the data center with the calculated cluster VM capacity for each of the clusters on the list; and
      to place a given workload on a given one of the clusters on the list based at least in part on the calculated cluster capacity for the given cluster.

12. The apparatus of claim 11, wherein storing the calculated host VM capacity and the calculated CPU variable weighting factor in the CMDB comprises, for a given one of the hosts in the list:
- updating a previously-stored host VM capacity value for the given host in the CMDB with the calculated host VM capacity for the given host responsive to determining that the calculated host VM capacity for the given host is different than the previously-stored host VM capacity value for the given host; and
- updating a previously-stored CPU variable weighting factor value for the given host in the CMDB responsive to determining that the calculated CPU variable weighting factor for the given host is different than the previously-stored CPU variable weighting factor value for the given host.

13. The apparatus of claim 11, wherein the at least one processing device is further configured:
- to determine an optimal memory configuration for each of the hosts on the list according to the calculated host VM capacity; and
- to change a memory configuration of at least one of the hosts on the list based on the optimal memory configuration.

14. The apparatus of claim 13, wherein changing the memory configuration comprises at least one of adding memory modules and removing memory modules from one of the hosts on the list in order to achieve an optimal density.

15. The apparatus of claim 11, wherein calculating the CPU variable weighting factor comprises:
- selecting a sample set of virtual machines on at least one of the hosts and the clusters on the list to analyze over a sample window for optimization;
- for each virtual machine of the sample set of virtual machines:
  - calculating average memory used by the virtual machine in the sample window;
  - calculating average amount of CPU cycles used by the virtual machine in the sample window; and
  - calculating individual variable weighting components for the virtual machine by dividing the average memory used by the average amount of CPU cycles used; and
- calculating the CPU variable weighting factor by averaging the individual variable weighting components for all of the virtual machines in the sample set of virtual machines.

16. A computer program product comprising a non-transitory computer-readable storage medium storing computer executable instructions that, when executed by at least one processing device cause the at least one processing device:
- to obtain a list of hosts and clusters in the data center;
- for each of the hosts on the list:
  - to query for memory and central processor unit (CPU) configuration information;
  - to calculate a host virtual machine capacity (VM capacity) and a CPU variable weighting factor; and
  - to store the calculated host VM capacity and the calculated CPU variable weighting factor in a configuration management database (CMDB);
- once the host VM capacity and the CPU variable weighting factor have been calculated for all of the hosts on the list, to calculate a cluster VM capacity for each of the clusters on the list;
- to process information to update the data center with the calculated cluster VM capacity for each of the clusters on the list; and
- to place a given workload on a given one of the clusters on the list based at least in part on the calculated cluster capacity for the given cluster.

17. The computer program product of claim 16, wherein storing the calculated host VM capacity and the calculated CPU variable weighting factor in the CMDB comprises, for a given one of the hosts in the list:
- updating a previously-stored host VM capacity value for the given host in the CMDB with the calculated host VM capacity for the given host responsive to determining that the calculated host VM capacity for the given host is different than the previously-stored host VM capacity value for the given host; and
- updating a previously-stored CPU variable weighting factor value for the given host in the CMDB responsive to determining that the calculated CPU variable weighting factor for the given host is different than the previously-stored CPU variable weighting factor value for the given host.

18. The computer program product of claim 16, wherein the executable instructions when executed by the at least one processing device further cause the at least one processing device:
- to determine an optimal memory configuration for each of the hosts on the list according to the calculated host VM capacity; and
- to change a memory configuration of at least one of the hosts on the list based on the optimal memory configuration.

19. The computer program product of claim 18, wherein changing the memory configuration comprises at least one of adding memory modules and removing memory modules from one of the hosts on the list in order to achieve an optimal density.

20. The computer program product of claim 16, wherein calculating the CPU variable weighting factor comprises:
- selecting a sample set of virtual machines on at least one of the hosts and the clusters on the list to analyze over a sample window for optimization;
- for each virtual machine of the sample set of virtual machines:
  - calculating average memory used by the virtual machine in the sample window;
  - calculating average amount of CPU cycles used by the virtual machine in the sample window; and
  - calculating individual variable weighting components for the virtual machine by dividing the average memory used by the average amount of CPU cycles used; and
- calculating the CPU variable weighting factor by averaging the individual variable weighting components for all of the virtual machines in the sample set of virtual machines.

* * * * *